United States Patent [19]

Saunders et al.

[11] 4,266,599

[45] May 12, 1981

[54] METHOD AND APPARATUS FOR CONTROLLING COMFORT CONDITIONS INCLUDING SETBACK

[75] Inventors: James F. Saunders, Onalaska; Robert E. Krocker, Stoddard, both of Wis.

[73] Assignee: The Trane Company, La Crosse, Wis.

[21] Appl. No.: 961,815

[22] Filed: Nov. 17, 1978

[51] Int. Cl.³ .................... F25B 13/00; F25B 29/00
[52] U.S. Cl. ........................................ 165/2; 165/12;
   165/16; 165/29; 62/157; 236/46 R
[58] Field of Search .................... 165/2, 12, 29, 16;
   62/157; 236/46 R, 91

[56] References Cited

U.S. PATENT DOCUMENTS

| 3,318,372 | 5/1967  | Shell ................................ 165/29     |
| 3,386,496 | 6/1968  | O'Connor ........................... 165/2       |
| 3,556,203 | 1/1971  | Kyle .................................. 165/29    |
| 3,777,803 | 12/1973 | Wood ................................ 165/2       |
| 3,929,284 | 12/1975 | Prewarski et al. .................. 236/46       |
| 3,964,677 | 6/1976  | Schalow et al. .................... 236/46 R     |
| 3,979,059 | 9/1976  | Davis et al. ....................... 236/46 R     |
| 4,040,565 | 8/1977  | Christiansen ....................... 236/91 G     |
| 4,079,366 | 3/1978  | Wong ................................ 340/309.4   |
| 4,122,893 | 10/1978 | Thompson .......................... 165/16       |
| 4,215,408 | 7/1980  | Games et al. ...................... 236/46 R     |

FOREIGN PATENT DOCUMENTS 1193711  6/1970  United Kingdom .

OTHER PUBLICATIONS

"The Effects of Reduced Indoor Temperature and Night Setback on Energy Consumption of Residential Heat Pumps", ASHRAE Journal, Feb. 1977, pp. 21-25 by R. D. Ellison.
"Energy Savings Through Thermostat Setback with Residential Heat Pumps", ASHRAE Annual Meeting, Jun. 25, 1978, paper delivered by Dr. Charles E. Bullock.
"Optimizer", pp. 174 and 175 of Specifying Engineer, Feb. 1978.
"Air Conditioning, Heating and Refrigeration News", Jul. 24, 1978.
"Air Conditioning, Heating and Refrigeration News", Aug. 21, 1978.
"Air Conditioning, Heating and Refrigeration News", Aug. 1, 1977.

*Primary Examiner*—Albert W. Davis
*Assistant Examiner*—Margaret A. Focarino
*Attorney, Agent, or Firm*—Carl M. Lewis; Peter D. Ferguson; Ronald M. Anderson

[57] ABSTRACT

Method and apparatus are disclosed for controlling and selectively setting back the comfort condition, such as temperature, within a conditioned zone utilizing a system which includes both preferred and back-up conditioning means, the former exhibiting more favorable energy consumption characteristics than the latter. The system is operable in both a normal mode, and in an economy mode during which the comfort condition is permitted to degrade toward an economy level during a setback period of predetermined duration. Selective operation of the preferred and back-up conditioning means is effected in order to minimize energy consumption during both modes and especially during the time that the comfort condition is restored to the normal level from the economy level. In a preferred embodiment, the preferred conditioning means comprise an electrically operated heat pump of the vapor compression type and the back-up conditioning means comprise electrical resistance-type heating means. A second aspect of the present invention involves the provision of a system which includes a refrigeration system for cooling a conditioned zone in conjunction with economizer means for supplying cool ambient air to the conditioned zone during those times when it is available and wherein operation thereof is effected in both normal and economy cooling modes so as to minimize the overall energy consumption of the system.

26 Claims, 8 Drawing Figures

METHOD AND APPARATUS FOR CONTROLLING COMFORT CONDITIONS INCLUDING SETBACK

TECHNICAL FIELD

The present invention relates generally to the field of air conditioning, including both heating and cooling, wherein the comfort condition, such as temperature, is to be maintained at a desired level within a conditioned zone. More specifically, the present invention relates to control schemes for heating and cooling systems which permit the "setback" of comfort conditions within the conditioned zone during predetermined periods so as to reduce energy consumption.

BACKGROUND ART

With increased emphasis being placed upon energy conservation in recent years, it has become important that air conditioning systems designed for space heating and cooling be operated in the most efficient and economical manner possible. In response to this desired objective, heating and cooling systems have been redesigned in order to improve their efficiencies, increased emphasis has been placed upon the use of more energy-efficient types of heating and cooling systems; work has been done on control systems which enable such systems to operate at the minimum level required in order to maintain a desired level of comfort conditioning; and building occupants have been asked simply to tolerate higher temperatures during the cooling season and lower temperatures during heating. As examples of the foregoing, one may note the increased use of heat pumps of the vapor compression type for supplying space heating, the use of solar heating to provide at least a portion of a building's space heating requirements, when possible; and the increased use of an economizer cycle wherein outdoor ambient air is used to satisfy building cooling loads during those times that the condition of the outdoor air is suitable for this purpose.

A control concept which has seen increasing popularity recently is referred to commonly as "temperature setback" wherein the comfort condition, usually temperature, to be maintained within a conditioned zone is varied from a normal level to an economy level during those times that it is feasible to do so. For example, during the heating season, the temperature within a particular conditioned zone may be maintained at say 70° F. during the daytime hours when the zone is occupied, and at, say 60° F. during the nighttime hours when the zone is either unoccupied or its occupants are asleep. In the case of commercial structures, it is often possible that the temperature may be set back over a weekend period when the zone is unoccupied. Similarly, during the cooling season, the temperature may be maintained at a normal level of say, 72° F. when the zone is occupied, at at an economy level of, say, 80° F. when it is unoccupied.

While there is no doubt that temperature setback is an effective method of reducing energy consumption for air conditioning systems wherein a single type of heating and/or cooling apparatus is involved, questions have been raised as to the applicability of the temperature setback concept in conjunction with systems of the type wherein two sources of either heating and/or cooling are available, one of which exhibits more favorable energy consumption characteristics than the other. A specific example of such a system would be one in which an electrically operated heat pump of the vapor compression type, representing a preferred conditioning means, and electrical resistance-type electrical heating means as a back-up conditioning means are provided, the former exhibiting more favorable energy consumption characteristics than the latter.

Similar considerations relative to the applicability of the temperature setback concept would be presented in the case of a cooling system wherein both a refrigeration system and an economizer cycle are provided, the latter of which would exhibit more favorable energy consumption characteristics than the former in providing cooling of a conditioned zone.

The present invention addresses the problems presented in adapting temperature setback to air conditioning systems of this type and sets forth control schemes therefor which insure that energy savings will be realized.

DISCLOSURE OF THE INVENTION

In one aspect of the present invention, method and apparatus are disclosed which comprise a system having selectively operable preferred and back-up conditioning means, each of which has a conditioning capacity associated therewith, for varying the comfort condition within a conditioned zone, said preferred conditioning means exhibiting more favorable energy consumption characteristics than the back-up conditioning means. The system may be operated in both a normal mode wherein the comfort condition is maintained at a normal level; and in an economy mode wherein the comfort condition is permitted to degrade toward an economy level during a setback period of predetermined duration. During both the normal and economy modes, the preferred conditioning means alone is operated when its capacity is adequate in order to maintain the respective normal or economy comfort condition within a conditioned zone. Should the capacity of the preferred conditioning means be inadequate in order to maintain either the comfort or economy condition, operation of both the preferred and back-up conditioning means is effected in order to maintain the desired comfort condition. In order to restore the comfort condition to the normal level by the end of the setback period, operation of the preferred conditioning means alone is initiated at a point in time such that its capacity is sufficient to restore the comfort condition to the normal level.

In a second aspect of the present invention, method and apparatus are disclosed for operating a system as described in the preceding paragraph and wherein substantially continuous operation of the preferred conditioning means is effected during the economy mode when its capacity is inadequate to at least maintain the comfort condition within the conditioned zone at the normal level, and wherein operation of the back-up conditioning means is initiated at a point in time during the setback period in order to restore the comfort condition within the conditioned zone to the normal level by the end of the setback period.

It is further desirable that the method and apparatus described in the preceding two paragraphs be incorporated in a single system which includes the capability of monitoring the comfort condition within the conditioned zone while the preferred conditioning means alone is restoring the comfort condition to the normal level and, should its capacity become inadequate to do so, effecting substantially continuous operation of the preferred conditioning means and, thereafter, initiating operation of the back-up conditioning means in order to provide restoration to the normal comfort condition.

In the preferred embodiment disclosed, the preferred conditioning means comprise an electrically operated heat pump of the vapor compression type and the back-up conditioning means comprise electrical resistance-type heating means.

A further aspect of the invention lies in the specific provision of method and apparatus including a system which includes a selectively operable refrigeration system for cooling a conditioned zone and economizer means for selectively supplying cool ambient air to the conditioned zone at those times it is available. Operation of this system is provided such that the refrigeration system is operative to maintain the comfort condition at respective normal and economy levels during operation in normal and economy modes, and wherein the economizer means is operated when available during both the normal and economy modes at least so long as the comfort condition within the zone is above the normal level. Operation of the refrigeration system is initiated, if necessary, at a point in time during the setback period in order to restore the comfort condition within the conditioned zone to the normal level by the end of the setback period.

Accordingly, it is an object of the present invention to provide a system including both preferred and back-up conditioning means as described previously, which system is operable in both normal and economy modes, and wherein the preferred conditioning means alone is utilized to restore the comfort condition to the normal level from the economy level so long as its capacity is adequate to do so.

A further object of the present invention lies in the provision of such a system wherein substantially continuous operation of the preferred conditioning means is effected during the economy mode so long as its capacity is adequate to at least maintain the comfort condition at the normal level; operation of the back-up conditioning means being initiated in order to restore the comfort condition to the normal level.

Yet another object of the present invention lies in method and apparatus including a system having a refrigeration system for cooling a conditioned zone and the economizer means for selectively supplying cool ambient air to the zone during those times it is available; the refrigeration system being operable in both normal and economy modes in order to maintain the appropriate comfort condition but wherein operation of the economizer means is effected when available during both normal and economy mode operation at least so long as the comfort condition within the zone is above the normal level.

These and other objects of the present invention will become apparent hereinafter wherein the best mode for carrying out the invention is discussed with reference to the appended drawings.

BEST MODE FOR CARRYING OUT THE INVENTION

Figure 1:
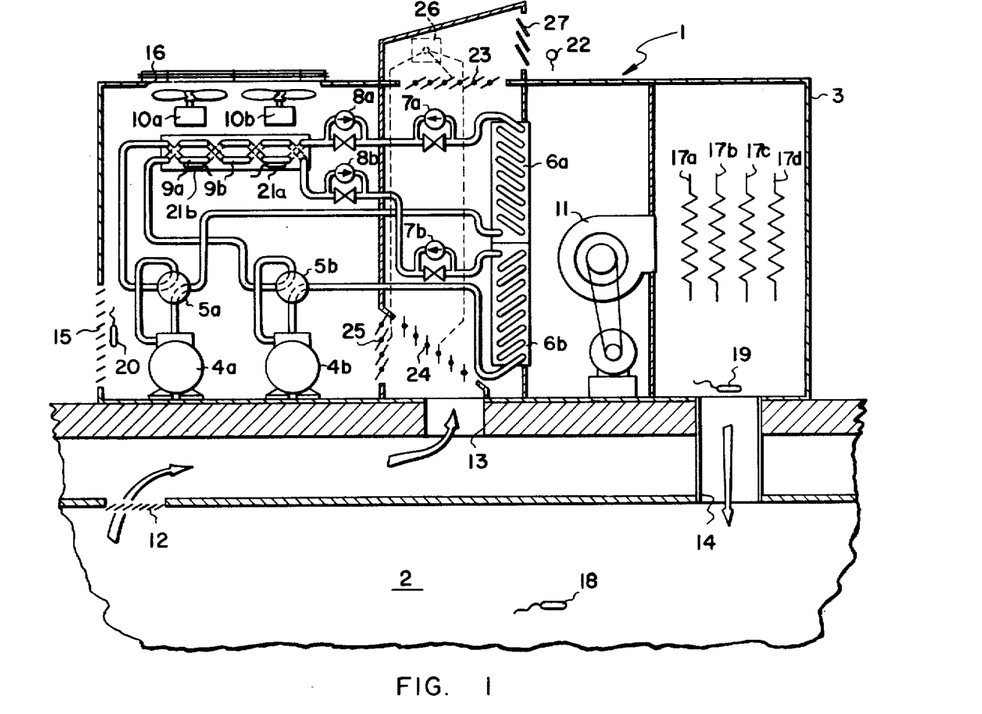
FIG. 1 is a cross-sectional view of air conditioning apparatus to which the present invention has application.

Turning initially to FIG. 1 of the drawings, a conditioning system indicated generally by the reference numeral 1 is illustrated for controlling the comfort condition, such as temperature, within a conditioned zone 2. The conditioning system itself is of generally conventional construction to the extent that it includes a casing 3 which, as shown, is mounted upon the roof of a structure being served; which casing contains the components of a system designed to heat or cool conditioned zone 2.

The system 1 includes an electrically operated dual circuit heat pump of the vapor compression type, each circuit of which includes a compressor 4, reversing valve means 5, indoor coil 6, expansion/bypass valve means 7 and 8, and outdoor coil 9. As shown, these components are conduit-connected so as to form a conventional reversible heat pump system which is operative to heat or cool conditioned zone 2. Ambient air is forced in heat exchange relation to outdoor coils 9 by outdoor fans 10a and 10b which draw air through a louvered inlet 15 and discharge same via an aperture 16 in the upper wall of casing 3.

An indoor fan 11 is provided which withdraws return air from conditioned zone 2 via openings 12 and 13 and draws same over indoor coils 6a and 6b in heat exchange relation therewith. The thus-conditioned air is discharged via a passage 14 back into the conditioned zone 2.

As is well known to those skilled in the art, compressors 4 are driven by suitable electric motors to compress a vaporized refrigerant, which then passes via reversing valves 5 to indoor heat exchange coils 6 where it condenses to heat the air passing thereover. The resulting condensed refrigerant then bypasses via expansion/bypass valve means 7 and is expanded by expansion/bypass valve means 8 prior to passing into outdoor heat exchange coils 9. The refrigerant is vaporized in outdoor heat exchange coils 9 by absorbing heat from ambient air passing thereover and then returns to compressors 4 via reversing valve means 5.

When cooling is required for conditioned zone 2, the positions of reversing valve means 5 are changed such that outdoor heat exchange coils 9 serve as condensers and indoor heat exchange coils 6 serve as evaporators to cool the air passing thereover.

Performance of heat pumps of the type described immediately above during heating is such that, at relatively moderate ambient temperatures, the ratio of heat energy output to electrical energy consumed (referred to as the coefficient of performance, or C.O.P.) may be on the order of 3.0. At reduced ambient temperatures, however, performance drops off to a C.O.P. which may be on the order of 1.5 or less, accompanied by a reduction in capacity as well. Thus, it is common practice that supplemental electrical resistance-type heat be provided with heat pumps of this type in order to augment their capacity when required at low ambients.

Accordingly, housing 3 also contains electrical resistance type heating means in the form of elements 17a through 17d, which are preferably disposed in the discharge of indoor fan 11 so as to transfer heat to the air passing thereover.

It will be readily appreciated by those skilled in the art that the energy consumption characteristics of the electrically operated vapor compression heat pump are more favorable than those of the electrical resistance type heating means, in that the C.O.P. of a heat pump is always in excess of 1 at practical operating temperatures, sometimes reaching values in excess of 3; whereas the C.O.P. of electrical resistance type heating means is always 1. Stated another way, the useful heat output of a vapor compression heat pump will always exceed the electrical energy input thereto, whereas the useful heat output of electrical resistance type heating means is always equal to the electrical energy input thereto. For this reason, the electrically operated vapor compression heat pump may be termed a preferred conditioning means, whereas the electrical resistance type heating means may be referred to as a back-up conditioning means. It is thus advantageous that the back-up conditioning means be operated only at those times when the capacity of the preferred conditioning means is inadequate, in order to minimize system energy consumption.

As disclosed above, conditioning system 1 is also operative to cool conditioned zone 2 when the reversible heat pump is operated in its cooling mode. As is known to those skilled in the art, it is also possible to effect cooling of a conditioned zone through the use of what is commonly referred to as an "economizer" cycle whereby cool ambient air may be supplied to the conditioned zone during those times it is available.

Conditioning system 1 is provided with means which enable it to operate in an economizer cycle and include an outdoor air inlet 27 through which cool ambient air may be drawn during those times that it is available. In order to control the admission of such ambient air, a set of outdoor air dampers 23 is provided in conjunction with return air admission dampers 24 and return air exhaust dampers 25.

During those times that the ambient conditions are suitable for operating in an economizer cycle, dampers 23 and 25 are opened, and dampers 24 closed such that indoor fan 11 draws ambient air via opening 27, dampers 23, over indoor coils 6, and discharges this cool air via passage 14 into conditioned zone 2. As is apparent, dampers 24 when in their closed position prevent air from being recirculated via indoor fan 11, which air is permitted to pass outwardly through dampers 25 to the ambient.

Dampers 23, 24, and 25 are under the control of common motor means 26 as are commercially available.

In the event that the capacity of the economizer is inadequate to satisfy a particular cooling load within zone 2, it is further possible that the reversible heat pump may be operated in its cooling mode, acting as a refrigeration system, in order to further cool the ambient air and thereby augment the capacity of the economizer means.

In terms of energy consumption characteristics, the economizer means would be aptly termed a preferred conditioning means, with the refrigeration system being properly denoted as a back-up conditioning means. Thus, it is desirable that the economizer means be permitted to handle the cooling load whenever its capacity is adequate to do so.

In order to proper control of conditioning system 1 be effected, it is necessary that operating conditions be sensed at various locations within the system. To this end, a plurality of temperature sensors are provided which include an indoor temperature sensor 18, duct temperature sensor 19, outdoor temperature sensor 20, and outdoor coil temperature sensors 21a and 21b. Preferably, these sensors comprise thermistors (temperature responsive resistors) which are connected in conventional electrical circuitry so as to provide an output voltage signal which varies with the sensed temperature. These voltage signals are then processed by control circuitry which will be described hereinafter.

Also illustrated in FIG. 1 is an enthalpy sensor 22 disposed at a position to sense the condition of ambient air and make a determination as to whether or not it is suitable for admission to condition zone 2 through operation of the economizer means. Enthalpy sensors of this type are commercially available which provide an on-off type signal indicative of economizer availability, taking into account both the temperature and relative humidity of the ambient air.

Figure 2:
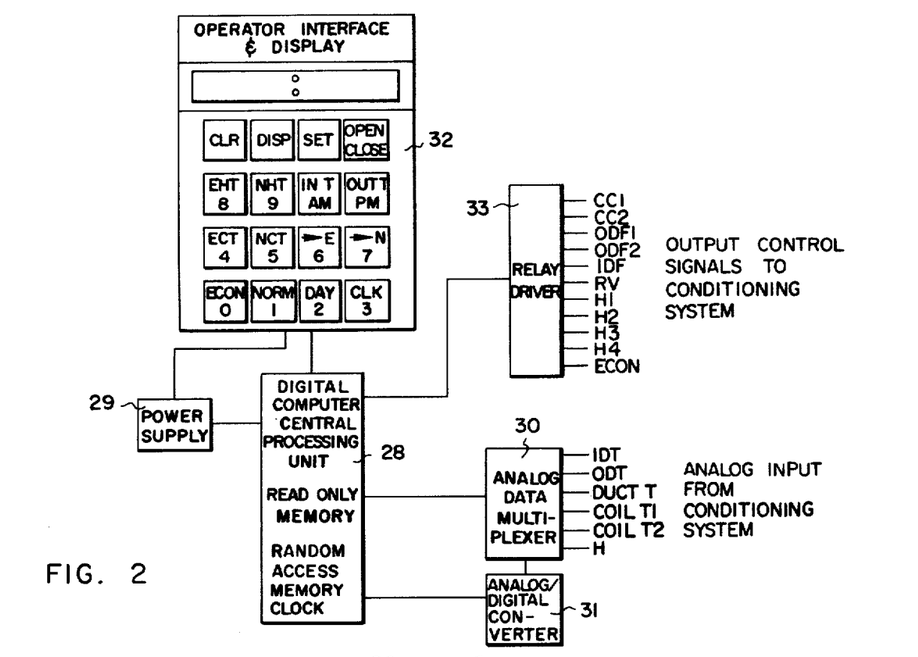
FIG. 2 is a general circuit schematic diagram of suitable control circuitry for carrying out the present invention.

Turning now to FIG. 2 of the drawings a general circuit schematic diagram is illustrated of suitable control means for effecting operation of conditioning system 1.

As shown in FIG. 2, the heart of the control means illustrated is a microcomputer 28 which also includes read only memory (ROM) and random access memory (RAM). In practice, this element preferably comprises an Intel brand Model 8748 or 8048 microcomputer which also includes built-in read only memory, random access memory, input/output lines and a clock. In addition, an Intel brand Model number 8755 or 8055 memory is included which contains additional read-only memory space and input/output lines.

As is conventional, a power supply is provided in order to supply appropriate voltages to the various components of the control means.

In order that the control means receive signals relative to the operating conditions of conditioning system 1, an analog data multiplexer 30 is provided which receives the respective indoor temperature, outdoor temperature, duct temperature, coil temperatures, and enthalpy signal from the sensors illustrated in FIG. 1 and discussed with respect thereto. Multiplexer 30, under control of microcomputer 28, transmits one of said signals at a time to analog/digital converter 31 which converts the analog voltage signal to digital form such that it may be processed by CPU 28. Multiplexers and converters of this type are well known in the art and, by way of example, may comprise a Motorola brand Model number MC14051BCP chip as the multiplexer and a conventional R2R ladder network in conjunction with a National Semiconductor LM 339 comparator as the converter.

Operator interface and display 32 is provided which includes a keyboard of the X-Y matrix type, as manufactured by Texas Instruments, and a display of the common cathode florescent type. Interface and display 32 provide a means whereby the conditioning system operator may program certain operating features into the control means and also provides a readout of operating conditions within the system, as will be described in greater detail hereinafter.

In order that the control means of FIG. 2 may transmit operating signals to conditioning system 1, a relay driver 33 is provided having outputs to the appropriate relays or contactors of each operating element of the system of FIG. 1. Specifically, these outputs are transmitted to compressor contactor 1, compressor contactor 2, outdoor fan 1, outdoor fan 2, the indoor fan, the reversing valve means, the four stages of electrical resistance type heating means, and the economizer drive motor. Preferably, relay driver 33 comprises a plurality of triacs which are selectively rendered conductive by application of a control voltage from microcomputer 28, thereby selectively energizing the appropriate components of conditioning system 1.

Microcomputer-based control means of the general type illustrated in FIG. 2 are commercially available on the market and those of ordinary skill in the art are suitably well-versed in order to appropriately connect the components illustrated in order to provide an operative control circuit. In addition, a vast amount of current literature is available relative to the proper operation and connection thereof, including that provided by manufacturers of the microcomputers themselves, such as Intel. For this reason no more detailed explanation is believed warranted in that one skilled in the art is readily able to understand and construct same so as to perform the control functions to be described hereinafter.

Figure 3:
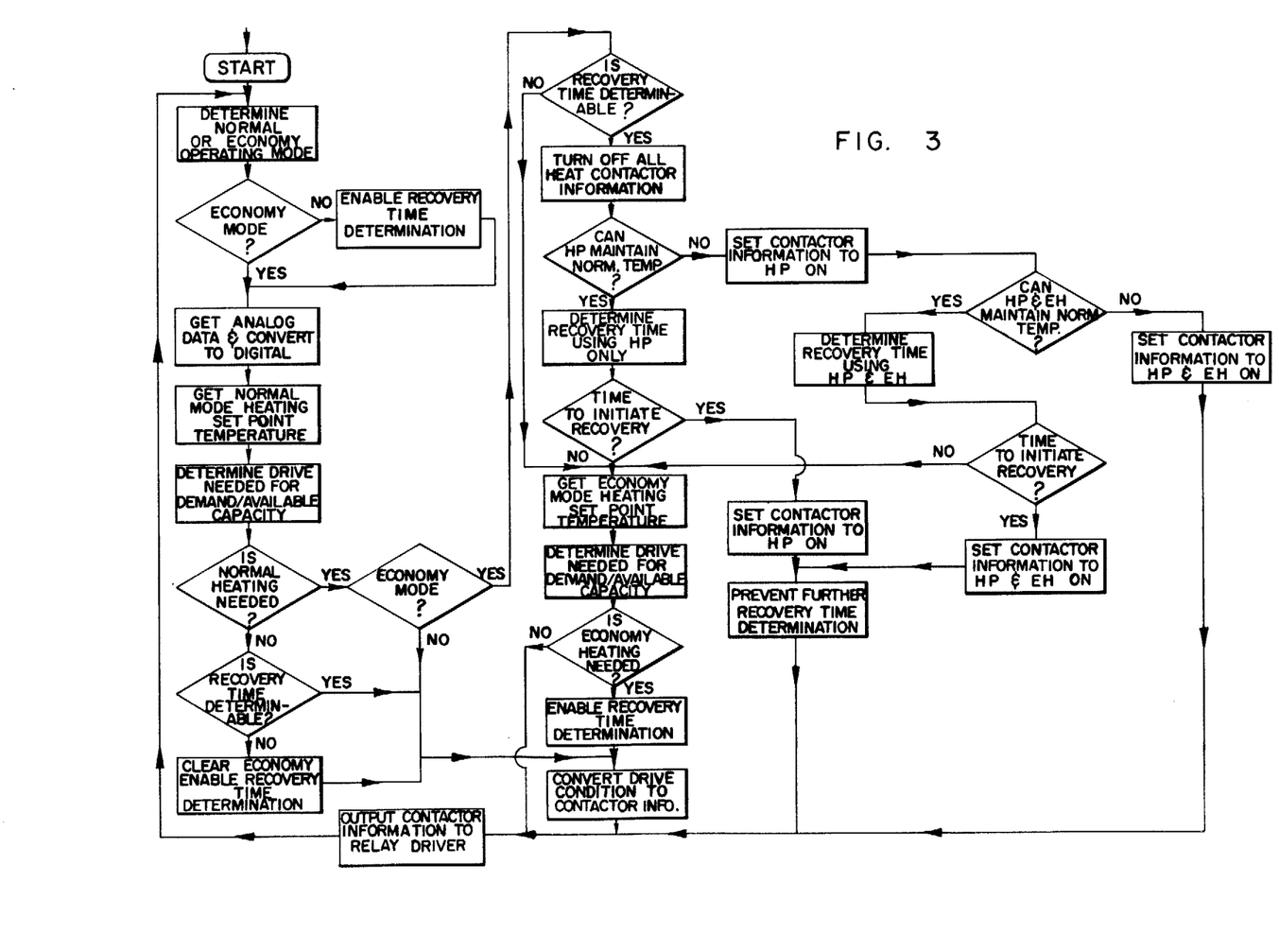
FIG. 3 is a flow chart illustrating the control theory utilized in carrying out first and second aspects of the present invention.

Microcomputer 28 contains stored in its read only memory a program which enables it to proceed in a logical and orderly fashion in analyzing the input data signals from conditioning system 1 and makes decisions as to the appropriate output control signals which should be transmitted by relay driver 33 to the conditioning system 1 in order to effect proper operation for the current operating conditions. FIG. 3 comprises a flow chart which illustrates the control logic provided by the aforementioned program in order to carry out a first aspect of applicants' invention.

Turning then to FIG. 3, it is seen that the first step is to determine whether the system is to be operated at a given time in a normal or economy operating mode; that is, whether the comfort condition to be maintained within conditioned zone 2 should be at a normal level; or if the operator has programmed a setback period of predetermined duration during which the comfort condition is permitted to degrade toward an economy level. If no economy mode is called for, a recovery time determination is enabled (the significance of which will appear hereinafter) and the program proceeds to collect analog data from the conditioning system and convert same to digital form.

Next, the program retrieves from memory the normal mode heating set point temperature which has been programmed by the operator and determines a "drive" needed to maintain that temperature in view of existing demand/available capacity. This determination takes into account the heating set point temperature, the existing current conditioned zone temperature, the duct temperature, and the outdoor air temperature in order to arrive at a value representative of the relative need for heating (or cooling) within conditioned zone 2. This value, in turn, is related to the available capacities of those conditioning system components which are required to be operated in order to meet this demand.

If the drive so-determined indicates a need for normal heating, the program proceeds to determine if the system should be operating in an economy mode. If the answer to this question is in the negative, the program proceeds to convert the drive condition to contactor information, which information is then transmitted to the relay driver in order to effect the desired system operation, following which the program is repeated.

If the system is operating in an economy mode, that is, if a setback period of predetermined duration has been programmed into the microcomputer for the particular time, the program proceeds to ascertain whether or not a recovery time is determinable. Since operation in the economy mode entails the maintenance of a comfort condition within conditioned zone 2 less than that desired under normal operating conditions, the control means are programmed so as to restore the comfort condition to the normal level by the end of the predetermined setback period. Assuming that a recovery time is determinable, the control means turn off all heat contactor information and proceeds to determine if the capacity of the heat pump alone is adequate to maintain the normal temperature within the conditioned zone. If so, a recovery time is computed using the heat pump alone and a determination made if it is time to initiate recovery relying upon the heat pump alone. If recovery should be initiated, the contactor information is set to "heat pump on" and further determination of recovery time is prevented. Thereafter, this contactor information is output to the relay driver and the recovery is thereby initiated using the heat pump alone.

During the next execution of the program, a new recovery time will not be determinable and the program will proceed to get the economy mode heating set point temperature and make a determination if economy heating is needed. Obviously, if recovery has been initiated, economy heating would only be needed in the event that the capacity of the heat pump alone had become inadequate to carry out the recovery. Thus, if economy heating is not needed, which would be the usual case, no change is made in the contactor information which is output to the relay driver and recovery continues. On the other hand, if economy heating is needed, a new recovery time determination is enabled and the drive needed in order to satisfy the need for economy heating is converted to contactor information which, in turn, is output to the relay driver. Under these conditions, a new recovery time may be determined utilizing the electrical resistance type heating means as will appear hereinafter.

Assuming next that the system is operating in its economy mode but that the capacity of the heat pump alone is inadequate to maintain the normal temperature within conditioned zone 2, the contactor information is set to effect substantially continuous operation of the heat pump. The term "substantially continuous" is used herein to define operation of the heat pump in this mode since, as is known to those familiar with heat pump operation, periodic defrost is required of the outdoor heat exchange coil which interrupts normal operation in the heating mode. Moreover, it may be desirable to terminate all heat pump operation at a predetermined low outdoor ambient temperature in order to reduce compressor wear. The term "substantially continuous" is intended to encompass the above operating conditions.

A further determination is next made as to whether or not the heat pump and the electric heat are together adequate to maintain normal temperature. Although the answer to this question will almost always be yes, in the event that their combined capacity is inadequate for some reason, such as an extremely low outdoor temperature, the contactor information will be set to both heat pump and electric heat on; which contactor information will be output to the relay driver.

If, as usually will be the case, the combined capacities of the heat pump and electric heat are adequate to maintain normal temperature, a recovery time will be determined using both and a determination made if recovery should be initiated in this mode. If yes, the contactor information is set appropriately, further recovery time determination is prevented, and this contactor information is output to the relay driver. If, on the other hand, it is not yet time to initiate recovery, the program will check to see whether economy heating is needed and, if so, the appropriate drive information will be converted to contactor information and transmitted to the relay driver.

Assuming now that recovery has been in effect for some time, such that the temperature within the conditioned zone has reached the normal level, the answer to the question "Is normal heating needed?" will become no. Since this could conceivably occur prior to the end of the setback period, a determination is made to see if a recovery time is determinable (as would be the case if the system were operating in a non-recovery mode) and if no recovery time is determinable, the economy mode operation is terminated and a recovery time determination enabled so as to return the system to its normal operating mode prior to expiration of the setback period.

It should be expressly noted that, at operation during conditions whereat the heat pump capacity is close to the heating load, e.g., at what is commonly termed the "balance point", the control means will effect substantially continuous operation of the heat pump; either because a very long recovery time will be required with the heat pump alone, or because it will be determined that the heat pump capacity is inadequate, resulting in substantially continuous operation thereof. Thus, at or close to the "balance point", little or no setback may be realized.

It will be appreciated that the blocks in the flow chart of FIG. 2 which are entitled, "Determine Drive Needed For Demand/Available Capacity" do so with respect to the particular normal or economy mode set point temperature which has been determined immediately preceding. The particular drive determined thereby will be related to the demand for conditioning and the available capacity at that time such that, at relatively high outdoor ambient temperatures, the heat pump alone would be energized in order to satisfy the demand without resort to the less energy efficient electrical resistance type heating means. Thus, during either the normal or economy heating mode, the heat pump alone will be energized so long as its capacity is adequate to maintain the respective normal or economy comfort level within the conditioned zone. Similarly, operation of both the heat pump and electric heat would be effected during both the normal and economy mode if the capacity of the heat pump alone is inadequate.

In the preferred embodiment, the algorithim utilized to determine drive is:

$$A = 2481 + 20 \, (TSET - TROOM) - TDUCT - TOUT$$

wherein
TSET is the particular set point temperature,
TROOM is the current room temperature,
TDUCT is the current duct temperature; and TOUT is the current outdoor ambient temperature.

The program permits the number A to vary between a maximum of 2415 (calling for maximum heating) and a minimum of 2304 (calling for maximum cooling). The number A is further operated upon by the program, so as to arrive at a 1 byte number rather than a 2 byte number, in accordance with the algorithim:

$$N = A - 2237.$$

The number N is then converted to a "drive pointer" in accordance with the following table in order to call for the appropriate machine condition:

| Nmax | Nmin | Pointer | Machine Condition |
|------|------|---------|-------------------|
| 82   | 00   | 1       | Cooling With Two Compressors |
| 95   | 69   | 2       | Cooling With One Compressor |
| 100  | 82   | 3       | Off Cool - RV in Cooling Position. |
| 118  | 100  | 4       | Off Heat - RV in Heating Position. |
| 130  | 105  | 5       | Heating With One Compressor |
| 140  | 117  | 6       | Heating With Two Compressors |
| 150  | 125  | 7       | Heating With Two Compressors + One Stage E.H. |
| 160  | 135  | 8       | Heating With Two Compressors + Two Stages E.H. |
| 170  | 195  | 9       | Heating With Two Compressors + Three Stages E.H. |
| 225  | 155  | 10      | Heating With Two Compressors + Four Stages E.H. |

Operation of the program is such that, in order for the drive pointer to increase, N must exceed Nmax while, in order to decrease, N must drop below Nmin. In this manner, hysterisis is provided for the control and excessive cycling between machine operating conditions is prevented.

The particular alogorithim utilized in the preferred embodiment to determine the recovery time is:

$$TR \text{ (in Hrs)} = TF \times \ln\left[\frac{BF + TOUT - TROOM}{BF + TOUT - NHT}\right]$$

wherein
TF is a "time factor" having a value between 20 and 70 which is programmed by the operator and represents the relative heat loss characteristics of the conditioned zone;
BF is a "balance factor" having a value between 20 and 70 (BF1) for heating with compressors only, and between 40 and 90 (BF2) for heating with compressors and electric heat. The operator programs these values as indications of the relative capacities of the heating means;
TOUT is the current outdoor ambient temperature;
TROOM is the current room temperature;
TDUCT is the current duct temperature; and
NHT is the current normal mode heating set point temperature.

It should be pointed out that the particular algorithims utilized in carrying out applicants' invention are not deemed critical and are disclosed herein in order to meet the "best mode" and "enabling" requirements of 35 U.S.C. 112. Those skilled in the art are readily able to arrive at other algorithims to carry out applicants' invention without departing from the scope thereof, as defined in the claims hereof.

The algorithims set forth herein, moreover, are further disclosed in the program attached hereto as Appendix A which is hereby incorporated by reference herein, as are all algorithims and steps required in order to carry out and practice the invention in the best mode known to applicants at this time. The specific program is not believed critical to an understanding of the invention but is included as an Appendix in order to assure compliance with the "best mode" and "enabling" requirements of 35 U.S.C. 112.

Figure 4A:
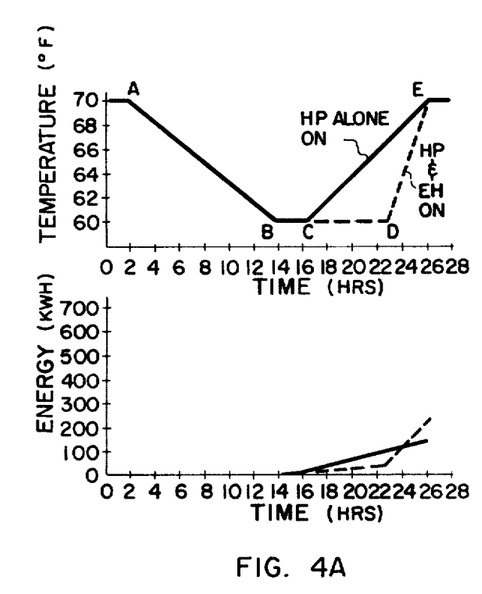
FIGS. 4A, 4B, 5A and 5B are graphical representations which serve to illustrate the energy savings brought about by the present invention.
Figure 4B:
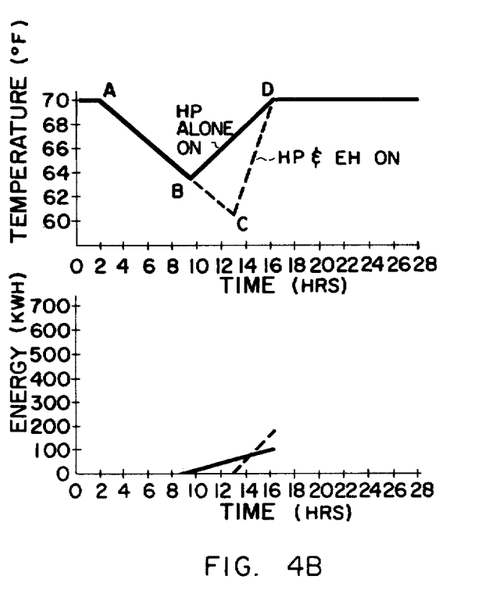
Figure 5A:
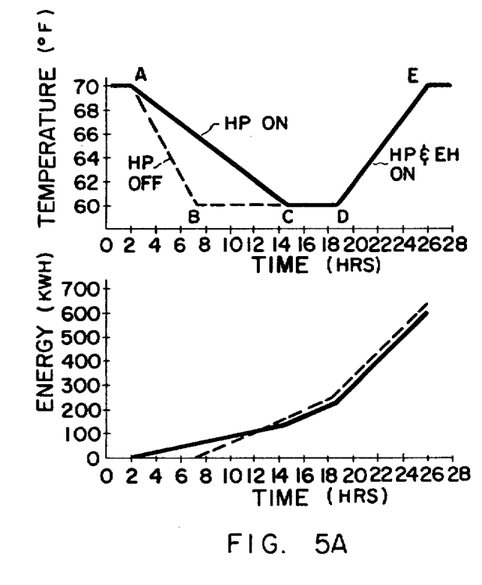
Figure 5B:
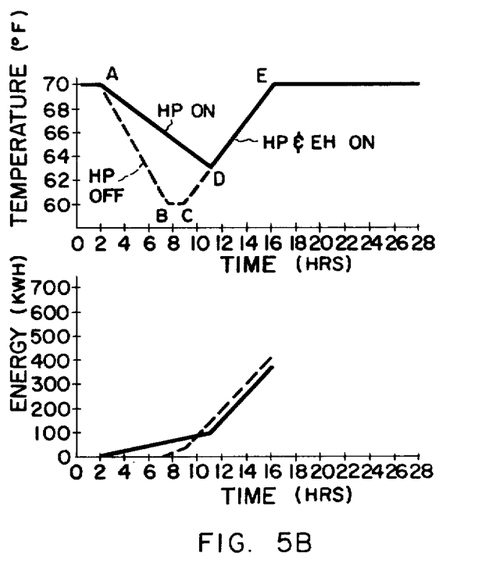

Turning now to FIGS. 4A, 4B, 5A, and 5B; operation of the conditioning system according to the flow chart of FIG. 3 will be described with respect to the illustrated graphs which plot the temperature within the conditioned zone versus time as well as energy consumption versus time. The specific data utilized in arriving at the graphs of these figures are based upon a reversible heat pump of the vapor compression type having a nominal cooling capacity of 10 tons which is further equipped with 40.5 KW of supplemental electrical resistance type heating elements. It is further assumed that the total supplemental heat capacity is utilized in restoring the zone temperature from economy level to normal level during recovery. The energy consumption required to maintain the zone at the economy level is based upon the average power requirements of the heat pump system at the particular outdoor temperature. For the purposes of these graphs, it was assumed that the heat pump system was installed in a dwelling of conventional construction and sized according to standard industry operating procedures. The specific data utilized in compiling FIGS. 4A and 4B are based upon an outdoor ambient temperature of 40° F.; while the graphs of FIGS. 5A and 5B are based upon an outdoor ambient temperature of 10° F.

Turning first to FIG. 4A, operation of the system according to the present invention proceeds along the solid line ABCE with the time period A to E constituting a setback period of predetermined duration. Thus, the temperature is permitted to degrade to the economy level from A to B; operation of the heat pump alone is effected from B to C in order to maintain the economy level temperature; and operation of the heat pump alone is effected from C to E in order to restore the zone temperature from the economy level to the normal level. The path defined by points ABCDE represent that which would be arrived at by relying upon both the heat pump and the supplemental electric heat in order to effect temperature recovery along the line DE. As is apparent from the energy versus time graph of FIG. 4A, the path ABCE according to the present invention effects substantial energy savings over that of path ABCDE.

The graphs of FIG. 4B are similar to that of 4A in that it is assumed that the capacity of the heat pump alone is adequate to maintain the conditioned zone at the normal comfort level. This operating path differs from FIG. 4A, however, in that the temperature within the conditioned zone never fully degrades to the economy level before the control means effect temperature recovery. Thus, recovery occurs along the line BD using the heat pump alone; contrasted with a control scheme operating along the path ABCD wherein both the heat pump and electric heat are utilized in effecting temperature recovery. Once again, the energy versus time graph of FIG. 4B illustrates the energy savings brought about through application of the present invention.

Turning next to FIGS. 5A and 5B, it is assumed that the capacity of the heat pump alone is inadequate to maintain the temperature within the conditioned zone at the normal level.

In FIG. 5A, operation according to applicants' invention proceeds along the solid-line path ACDE. From A to C the temperature within the conditioned zone is permitted to degrade from the normal level to the economy level while operation of the heat pump is effected on a substantially continuous basis. From C to D, operation of both the heat pump and electric heat is effected so as to maintain the temperature at the economy level; and from D to E temperature recovery is effected through operation of both the heat pump and electric heat. In contrast, the path ABCDE represents that which would result from leaving the heat pump off during the time that the temperature within the conditioned zone is permitted to degrade; e.g., from A to B. From B to C operation of both the heat pump and electric heat would be effected in order to maintain the temperature at the economy level. The energy versus time graph of FIG. 5A illustrates the energy savings brought about through application of the present invention to a conditioning system under this set of operating conditions.

The graphs of FIG. 5B are similar to those of FIG. 5A except that the temperature is never permitted to degrade fully to the economy level before temperature recovery is initiated. Once again, the energy versus time graph of FIG. 5B illustrates energy savings brought about by applicants' invention.

Table I which follows immediately below is a compilation of the energy consumption statistics of FIGS. 4A, 4B, 5A, and 5B; and specifically sets forth the percentage energy savings brought about through application of the present invention.

TABLE I

| | ENERGY CONSUMPTION COMPARISON | | | | |
|---|---|---|---|---|---|
| | INVENTION | | PRIOR ART | | |
| | PATH | ENERGY (KWH) | PATH | ENERGY (KWH) | % SAVINGS |
| FIG. 4A | A B | 0 | A B | 0 | |
| | B C | 11 | B C | 11 | |
| | C E | 138 | C D | 33 | |
| | | | D E | 177 | |
| | | 149 | | 221 | 48% |
| FIG. 4B | A B | 0 | A B | 0 | |
| | B D | 94 | B C | 0 | |
| | | | C D | 167 | |
| | | 94 | | 167 | 78% |
| FIG. 5A | A C | 145 | A B | 0 | |
| | C D | 85 | B C | 164 | |
| | D E | 381 | C D | 85 | |
| | | | D E | 380 | |
| | | 611 | | 529 | 3% |
| FIG. 5B | A D | 98 | A B | 0 | |
| | D E | 275 | B C | 27 | |
| | | | C D | 106 | |
| | | | D E | 275 | |
| | | 373 | | 408 | 9% |

Figure 6:
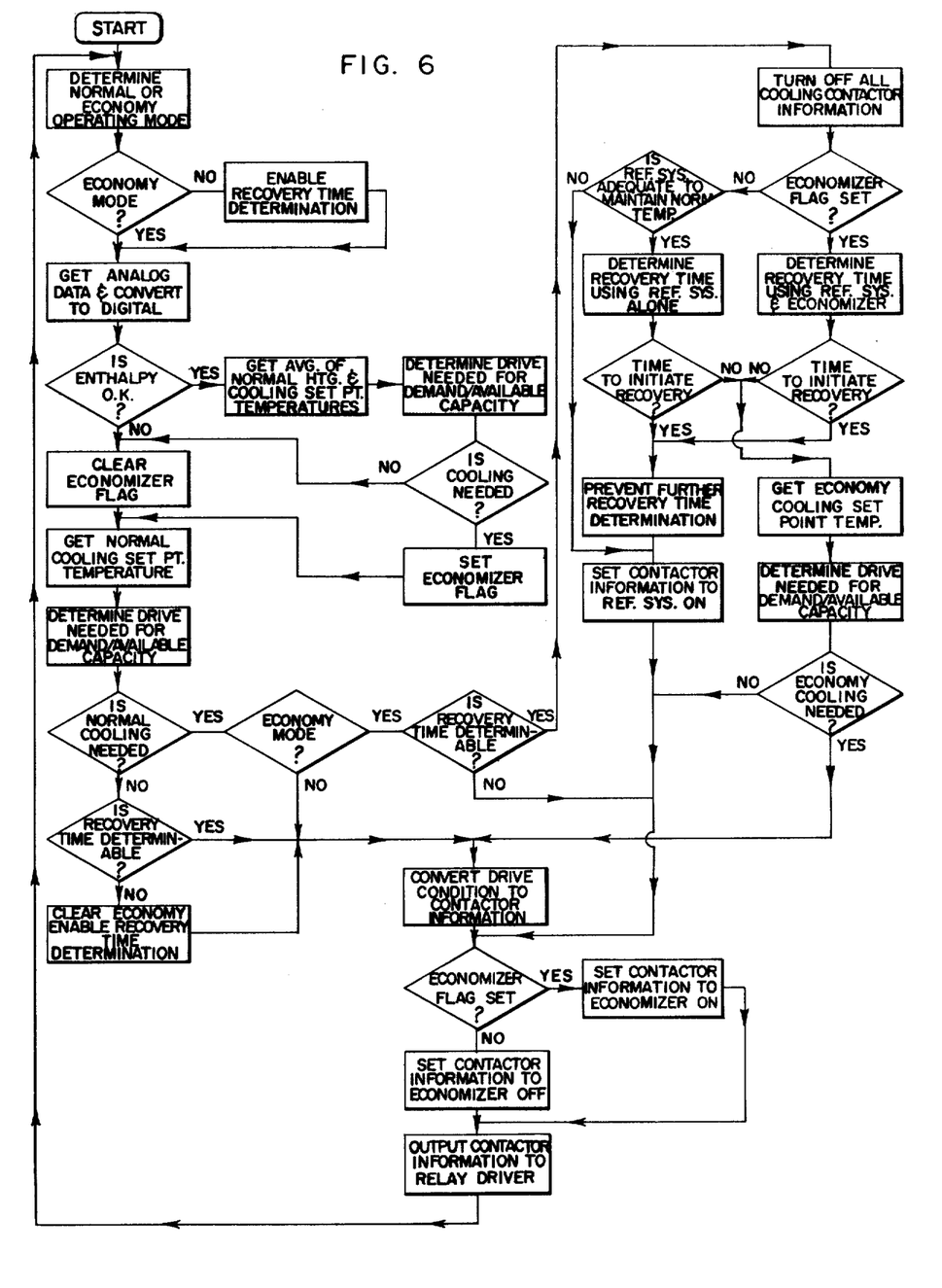
FIG. 6 is a flow chart illustrating the control theory utilizing in carrying out a further aspect of the present invention.

Turning next to FIG. 6 of the drawings, operation of the conditioning system of the present invention in its cooling mode will be described with respect to the illustrated flow chart. It will be recalled that conditioning system 1 as illustrated in FIG. 1 includes both a refrigeration system comprising a reversible heat pump and economizer means in order to effect cooling within conditioned zone 2.

Since many of the steps illustrated in the flow chart of FIG. 5 are the same as those illustrated and discussed with respect to FIG. 3, the following discussion will concentrate on the differences therein and in describing the inventive concepts embodied in the flow chart of FIG. 5.

In order to determine if the condition of the outside air is suitable for comfort conditioning utilizing the economizer means, enthalpy sensor 22 provides a signal in order to answer the question "Is enthalpy O.K.?" shown in FIG. 6. If this question is answered affirmatively, the program moves on to obtain the average of the normal heating set point temperature and the normal cooling set point temperature and, based on this average, determines the drive needed for the existing demand/available capacity. If cooling is needed based on this drive determination, the economizer "flag" is set and the program returns to its main stream. If no cooling is needed, the flow chart also returns to the main stream but proceeds to clear the economizer flag which results in its being disabled.

A determination is next made as to whether or not normal cooling is needed and, if so, if the system is to be operating in an economy mode. If no economy mode is indicated, the program proceeds to convert the drive condition to contactor information and then proceeds to determine if the economizer is available at that present time. If so, the contactor information is further modified to provide operation of the economizer; the thus-modified contactor information is then output to the relay driver in order to effect the desired operating conditions within conditioning system 1.

If the system is indicated as being operated in an economy mode, the program proceeds initially to see if a recovery time is determinable; that is, whether or not the system is currently undergoing recovery. If a recovery time is determinable, the program proceeds to turn off all cooling contactor information and determine again if the economizer is available. If it is not available, the program must determine if the refrigeration system alone is adequate to maintain the normal comfort level within the conditioned zone. If not, which would represent an unusual operating condition, the contactor information is set to refrigeration system on and this information is output to the relay driver. If, as would more likely be the case, the refrigeration system is adequate to maintain the normal comfort condition, a determination is made of the recovery time to the normal comfort level using only the refrigeration system. If it is not yet time to initiate recovery, the program proceeds to determine if economy cooling is needed and, if so, to effect operation of the conditioning system in accordance with the drive determined to be necessary.

If it is, in fact, time to initiate temperature recovery, the program prevents a further recovery time determination and then sets the contactor information to refrigeration system on, which information is output to the relay driver in order to initiate recovery.

Assuming that the economizer is available during operation in the economy mode, the program will determine an appropriate recovery time taking into account the economizer availability and proceed to initiate recovery at the appropriate time while also maintaining economy cooling until it is time to initiate recovery.

It is important to note that operation of the economizer means is effected by the logic illustrated in FIG. 6 irrespective of the need for economy cooling or, in fact, for normal cooling. This is due to the computation of the average of the normal heating temperature and normal cooling temperature, which will always be lower than the normal cooling temperature alone. Thus, operation of the economizer means is effected to a maximum extent so as to minimize overall energy consumption of the system.

The algorithim utilized to determine the drive needed for cooling is the same as that previously described with respect to FIG. 3 for heating.

The algorithim used to determine recovery time during cooling varies, depending upon whether or not the economizer is available, as follows:

If economizer not available, $$TR \text{ (in Hrs)} = TF \times \ln\left[\frac{BF - TOUT + TROOM}{BF - TA + NCT}\right]$$

If economizer available, $$TR \text{ (in Hrs.)} = TF \times \ln\left[\frac{BF - TOUT + TROOM}{BF - 2TA + TROOM + NCT}\right]$$

wherein
TF, TOUT, and TROOM have the same meaning as in the heating recovery time determinations, and
BF is a cooling "balance factor" having a value between 10 and 40 programmed by the operator as an indicator of the capacity of the cooling means; and
NCT is the normal mode cooling set point temperature.

These algorithims are also contained in the program attached hereto as Appendix A and the comments made previously with respect thereto also are applicable here.

It will be further appreciated by those skilled in the art that the flow charts of FIGS. 3 and 6, although illustrated separately for the sake of clarity, are actually integrated by the program into a single logical flow chart so as to optimize use of the microcomputer capability. Moreover, the complete program performs functions not specifically illustrated in FIG. 3 or 5, such as effecting defrost of the outdoor heat exchange coils during heating, preventing excessive cycling of the compressors, and modifying outdoor fan operation when cooling during low outdoor ambient air temperatures.

The keyboard illustrated in FIG. 2 in conjunction with the operator interface 32 provides a means whereby the operator may program certain operating information into the control means. The glossary of terms listed immediately below explains the abbreviated expressions utilized in FIG. 2.

GLOSSARY

CLR—Clear
DISP—Display
SET—SET
Open/Close—Locks keyboard
EHT—Economy heating temperature set point.
NHT—Normal heating temperature set point.
ECT—Economy cooling temperature set point.
IN T—Indoor Temperature
OUT T—Outdoor Temperature
→E—Time to go to economy mode.
→N—Time to go to normal mode.

ECON—The days of the week that are to be all economy operation.

NORM—The days of the week that are to be all normal operation.

DAY—The current day of the week.

CLK—Clock of "Time of day".

To illustrate operation of the keyboard, the following brief examples should serve as a guide. To set the clock, depress SET, CLK, the time, and AM or PM. To set the day of the week, depress SET, DAY, and a number from 1 through 7. To set the time to economy or time to normal operation, depress SET, E or N, the time, and AM or PM. To set a particular day of the week to all economy operation or all normal operation, depress SET, ECON or NORM, and the desired day of the week as number 1 through 7. To set the various economy or normal set point temperatures, depress SET followed by ECT, NCT, NHT, or EHT, and the desired temperature in degrees Fahrenheit. In order to effect proper system operation the various set point temperatures must be such that the ECT, NCT, NHT, and EHT are in decreasing order with ECT being the highest.

Similarly the operator interface and display is capable of displaying certain system operation parameters such as the set point temperatures, indoor and outdoor temperatures, time of day, day of week, and the programmed times to operate in an economy mode. This data is displayed by depressing DISP followed by the appropriate key for that information desired.

Although the invention has been disclosed in terms of a microcomputer-based control system, as this is believed the best mode for carrying out the invention at the present time; it is possible that the control could also be constructed using hard-wired logic electrical components or, on the other hand, using a more sophisticated larger digital computer which may be available on site.

Further, it should be pointed out that, although the respective preferred and back-up conditioning means specifically set forth in the preferred embodiment comprise an electrically operated heat pump of the vapor compression type and electrical resistance-type heating means, both of which are operable in heating modes; it is contemplated that such means could comprise not only other types of heating means having the specified relationship of energy consumption characteristics, but also cooling means which exhibit said relationship.

The "comfort condition" refered to herein, although usually temperature, may also comprise other indicators of comfort, such as humidity, or combination of temperature and humidity.

Thus, while the invention has been described with respect to a preferred embodiment, it is to be understood that modifications thereto will become apparent to those skilled in the art, which modifications lie within the scope of the present invention, as defined in the claims which follow.

We claim:

1. A method of operating a system for controlling the comfort condition within a conditioned zone, said system including selectively operable preferred and back-up conditioning means, each having a conditioning capacity associated therewith, for varying the comfort condition within said conditioned zone, said preferred conditioning means exhibiting more favorable energy consumption characteristics than said back-up conditioning means; said method comprising the steps of a. effecting operation of said preferred conditioning means alone when its capacity is adequate in order to maintain the comfort condition within said conditioned zone at a normal level during operation in a normal mode;

b. effecting operation of both said preferred and back-up conditioning means when the capacity of said preferred conditioning means alone is inadequate in order to maintain the comfort condition within said conditioned zone at said normal level during operation in said normal mode;

c. permitting the comfort condition within said conditioned zone to degrade toward an economy level during a setback period of predetermined duration for operation in an economy mode;

d. effecting operation of said preferred conditioning means alone when its capacity is adequate in order to maintain the comfort condition within said conditioned zone at said economy level during operation in said economy mode;

e. effecting operation of both said preferred and back-up conditioning means when the capacity of said preferred conditioning means is inadequate in order to maintain the comfort condition within said conditioned zone at said economy level during operation in said economy mode; and f. determining at the start of said setback period and during its term whether the capacity of said preferred conditioning means alone is adequate to restore the comfort condition within said conditioned zone to said normal level and initiating operation of said preferred conditioning means alone at a point in time during said setback period when its capacity is adequate to restore the comfort condition within said conditioned zone to said normal level by the end of said setback period.

2. The method of claim 1 wherein step (1f) occurs before the comfort condition within said conditioned zone has fully degraded to said economy level, if necessary.

3. The method of claim 1 further comprising the steps of a. effecting substantially continuous operation of said preferred conditioning means during said economy mode when its capacity is inadequate to so-restore the comfort condition within said conditioned zone to said normal level; and b. initiating operation of said back-up conditioning means when the capacity of said preferred conditioning means alone is inadequate at a point in time during said setback period in order to restore the comfort condition within said conditioned zone to said normal level by the end of said setback period.

4. The method of claim 3 further comprising the step of monitoring the comfort condition within said conditioned zone following step (1f) and, should the capacity of the preferred conditioning means alone become inadequate to restore the comfort condition to said normal level, proceeding to steps (3a) and (3b).

5. The method of claim 3 wherein step (3b) occurs before the comfort condition within said conditioned zone has fully degraded to said economy level if necessary.

6. The method of claims 1, 2, 3, 4, or 5 wherein said comfort condition comprises the temperature within said conditioned zone.

7. The method of claims 1, 2, 3, 4, or 5 wherein said system is adapted to heat said conditioned zone, said preferred conditioning means comprising an electrically operated heat pump of the vapor compression type and said back-up conditioning means comprising electrical resistance-type heating means.

8. The method of claim 7 wherein said comfort condition comprises the temperature within said conditioned zone; said normal level temperature being greater than said economy level temperature.

9. A method of operating a system for controlling the comfort condition within a conditioned zone, said system including selectively operable preferred and back-up conditioning means, each having a conditioning capacity associated therewith, for varying the comfort condition within said conditioned zone, said preferred conditioning means exhibiting more favorable energy consumption characteristics than said back-up conditioning means; said method comprising the steps of
  a. effecting operation of said preferred conditioning means alone when its capacity is adequate in order to maintain the comfort condition within said conditioned zone at a normal level during operation in a normal mode;
  b. effecting operation of both said preferred and back-up conditioning means when the capacity of said preferred conditioning means alone is inadequate in order to maintain the comfort condition within said conditioned zone at said normal level during operation in said normal mode;
  c. permitting the comfort condition within said conditioned zone to degrade toward an economy level during a setback period of predetermined duration for operation in an economy mode;
  d. effecting operation of said preferred conditioning means alone when its capacity is adequate in order to maintain the comfort condition within said conditioned zone at said economy level during operation in said economy mode;
  e. effecting operation of both said preferred and back-up conditioning means when the capacity of said preferred conditioning means is inadequate in order to maintain the comfort condition within said conditioned zone at said economy level during operation in said economy mode;
  f. determining at the start of said setback period and during its term whether the capacity of said preferred conditioning means alone is adequate to restore the comfort condition within said conditioned zone to said normal level and effecting substantially continuous operation of said preferred conditioning means during said economy mode when its capacity is inadequate to so-restore the comfort condition within said conditioned zone to said normal level; and
  g. initiating operation of said back-up conditioning means when the capacity of said preferred conditioning means alone is inadequate at a point in time during said setback period in order to restore the comfort condition within said conditioned zone to said normal level by the end of said setback period.

10. The method of claim 9 wherein step (9g) occurs before the comfort condition within said conditioned zone has fully degraded to said economy level if necessary.

11. The method of claims 9 or 10 wherein said comfort condition comprises the temperature within said conditioned zone.

12. The method of claims 9 or 10 wherein said system is adapted to heat said conditioned zone, said preferred conditioning means comprising an electrically operated heat pump of the vapor compression type and said back-up conditioning means comprising electrical resistance-type heating means.

13. The method of claim 12 wherein said comfort condition comprises the temperature within said conditioned zone; said normal level temperature being greater than said economy level temperature.

14. A system for controlling the comfort condition within a conditioned zone, said system including selectively operable preferred and back-up conditioning means, each having a conditioning capacity associated therewith, for varying the comfort condition within said conditioned zone, said preferred conditioning means exhibiting more favorable energy consumption characteristics than said back-up conditioning means; said system further including control means for
  a. effecting operation of said preferred conditioning means alone when its capacity is adequate in order to maintain the comfort condition within said conditioned zone at a normal level during operation in a normal mode;
  b. effecting operation of both said preferred and back-up conditioning means when the capacity of said preferred conditioning means alone is inadequate in order to maintain the comfort condition within said conditioned zone at said normal level during operation in said normal mode;
  c. permitting the comfort condition within said conditioned zone to degrade toward an economy level during a setback period of predetermined duration for operation in an economy mode;
  d. effecting operation of said preferred conditioning means alone when its capacity is adequate in order to maintain the comfort condition within said conditioned zone at said economy level during operation in said economy mode;
  e. effecting operation of both said preferred and back-up conditioning means when the capacity of said preferred conditioning means is inadequate in order to maintain the comfort condition within said conditioned zone at said economy level during operation in said economy mode; and
  f. determining at the start of said setback period and during its term whether the capacity of said preferred conditioning means alone is adequate to restore the comfort condition within said conditioned zone to said normal level and initiating operation of said preferred conditioning means alone at a point in time during said setback period when its capacity is adequate to restore the comfort condition within said conditioned zone to said normal level by the end of said setback period.

15. The system of claim 14 wherein said control means are operative to execute step (1f) before the comfort condition within said conditioned zone has fully degraded to said economy level, if necessary.

16. The system of claim 14 wherein said control means are further operative for
  a. effecting substantially continuous operation of said preferred conditioning means during said economy mode when its capacity is inadequate to so-restore the comfort condition within said conditioned zone to said normal level; and
  b. initiating operation of said back-up conditioning means when the capacity of said preferred conditioning means alone is inadequate at a point in time during said setback period in order to restore the comfort condition within said conditioned zone to said normal level by the end of said setback period.

17. The system of claim 16 wherein said control means are further operative to monitor the comfort condition within said conditioned zone following execution of step (14f) and, should the capacity of the preferred conditioning means become inadequate to restore the comfort condition to said normal level, executing steps (16a) and (16b).

18. The method of claim 16 wherein said control means are operative to execute step (16b) before the comfort condition within said conditioned zone has fully degraded to said economy level, if necessary.

19. The system of claims 14, 15, 16, 17, or 18 wherein said comfort condition comprises the temperature within said conditioned zone.

20. The method of claims 14, 15, 16, 17, or 18 wherein said system is adapted to heat said conditioned zone, said preferred conditioning means comprising an electrically operated heat pump of the vapor compression type and said back-up conditioning means comprising electrical resistance-type heating means.

21. The method of claim 20 wherein said comfort condition comprises the temperature within said conditioned zone; said normal level temperature being greater than said economy level temperature.

22. A system for controlling the comfort condition within a conditioned zone, said system including selectively operable preferred and back-up conditioning means, each having a conditioning capacity associated therewith, for varying the comfort condition within said conditioned zone, said preferred conditioning means exhibiting more favorable energy consumption characteristics than said back-up conditioning means; said system further including control means for
   a. effecting operation of said preferred conditioning means alone when its capacity is adequate in order to maintain the comfort condition within said conditioned zone at a normal level during operation in a normal mode;
   b. effecting operation of both said preferred and back-up conditioning means when the capacity of said preferred conditioning means alone is inadequate in order to maintain the comfort condition within said conditioned zone at said normal level during operation in said normal mode;
   c. permitting the comfort condition within said conditioned zone to degrade toward an economy level during a setback period of predetermined duration for operation in an economy mode;
   d. effecting operation of said preferred conditioning means alone when its capacity is adequate in order to maintain the comfort condition within said conditioned zone at said economy level during operation in said economy mode;
   e. effecting operation of both said preferred and back-up conditioning means when the capacity of said preferred conditioning means is inadequate in order to maintain the comfort condition within said conditioned zone at said economy level during operation in said economy mode;
   f. determining at the start of said setback period and during its term whether the capacity of said preferred conditioning means alone is adequate to restore the comfort condition within said conditioned zone to said normal level and effecting substantially continuous operation of said, preferred conditioning means during said economy mode when its capacity is inadequate to so-restore the comfort condition within said conditioned zone to said normal level; and
   g. initiating operation of said back-up conditioning means when the capacity of said preferred conditioning means alone is inadequate at a point in time during said setback period in order to restore the comfort condition within said conditioned zone to said normal level by the end of said setback period.

23. The system of claim 22 wherein said control means are operative to execute step (22g) before the comfort condition within said conditioned zone has fully degraded to said economy level, if necessary.

24. The system of claims 22 or 23 wherein said comfort condition comprises the temperature within said conditioned zone.

25. The system of claims 22 or 23 wherein said system is adapted to heat said conditioned zone, said preferred conditioning means comprising an electrically operated heat pump of the vapor compression type and said back-up conditioning means comprising electrical resistance-type heating means.

26. The method of claim 25 wherein said comfort condition comprises the temperature within said conditioned zone; said normal level temperature being greater than said economy level temperature.

* * * * *